B. AMES.

RAZOR.

APPLICATION FILED APR. 18, 1917.

Reissued Nov. 19, 1918. 14,551.

INVENTOR:
BUTLER AMES
By Rohrts Rohrts Cushman
HIS ATTORNEYS:

UNITED STATES PATENT OFFICE.

BUTLER AMES, OF LOWELL, MASSACHUSETTS.

RAZOR.

14,551. Specification of Reissued Letters Patent. Reissued Nov. 19, 1918.

Original No. 1,192,367, dated July 25, 1916, Serial No. 37,681, filed July 2, 1915. Application for reissue filed April 18, 1917. Serial No. 163,067.

*To all whom it may concern:*

Be it known that I, BUTLER AMES, a citizen of the United States, residing at Lowell, in the county of Middlesex and State of Massachusetts, have invented certain new and useful Improvements in Razors, of which the following is a specification, reference being had therein to the accompanying drawing.

My invention relates particularly to means for removably securing a metallic blade of an instrument, say a razor, to its support or handle; and may be said to reside in a suitable structure making use of magnetism in attaining this purpose.

The advantages of such a structure are that it does away with the necessity of using screw connections formerly employed, the parts may be assembled or taken apart with great ease and speed; there are no small parts to be dropped and lost; and the magnetic lines of force, while the blade is in position, flow through it with a beneficial effect of improving the cutting qualities of the blade.

In the drawings illustrating the principle of my invention and the best mode now known to me of embodying the same in operative structure, Figure 1 is an elevation partly in section of a razor embracing my invention;

Figure 1:
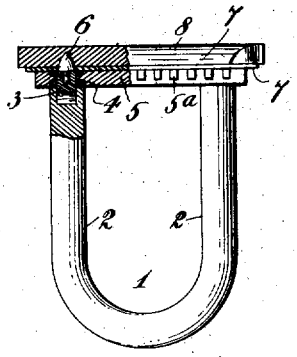
Figure 2:
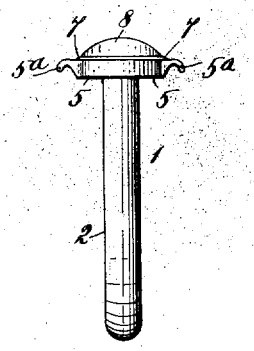
Fig. 2 shows an end view of the same.
Figure 3:
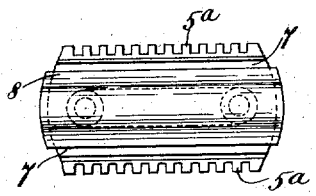
Fig. 3 is a plan of it.
Figure 4:
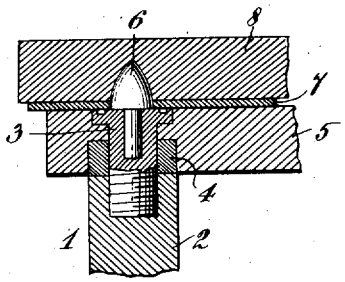
Fig. 4 illustrates an enlarged detail, one pole piece of a magnet provided with co-operating parts for attaining the object of my invention.
Figure 5:
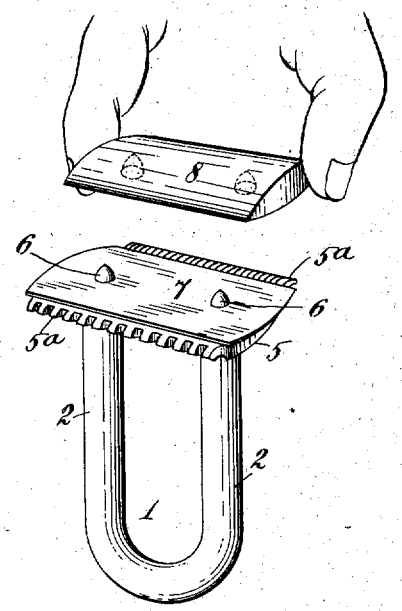
Fig. 5 is a perspective view showing the manner of assembling or demounting the razor blade and its co-acting members.

A horseshoe magnet 1 of such size as to be conveniently grasped in the hand, has legs 2 which are circular in cross section, say one-quarter of an inch in diameter, and one inch apart. They are made of magnet steel, and then hardened the desired amount, but before they are so hardened, each pole piece of the magnet, in the direction of its length, has a threaded hole provided for the reception of a metallic flat-headed retaining screw 3 later to be described. A ring 4 of soft iron having the same diameter as the legs of the magnet, abuts the end of each leg, while a cross bar 5 of brass or other non-magnetic material provided with safety fingers $5^a$, is mounted upon, and unites these end portions of the magnet; the under and upper sides of the safety bar being recessed to receive respectively the rings and the flat-headed screws 3; the tops of the heads being flush with the top surface of the safety bar. Permanently fixed in the longitudinal axis of each screw is a round nosed guide and lock pin 6, which necessitates having spanner holes in the screw head. A thin rectangular double razor blade 7 with two holes registers with the guide and lock pins 6; as does a lock cap 8 of soft iron, the cap being narrower and longer than the blade, while the blade is narrower than the safety bar with its protecting fingers $5^a$. In short, the above apparatus described is a safety razor provided with a magnetically rather than mechanically secured blade.

It will be observed that the magnet, rings, screws, guide pins and bar are for all practical purposes permanently assembled for use and form a unitary structure; while the lock cap and blade are manually separable.

When the parts of the complete magnet are in operative position, the magnetic lines of force flow from one pole of the magnet to the other, that is to say, for example, from the leg, through the ring, screw, guide pin, cap and razor blade, and the guide pin, screw, ring of the leg.

The guide pins rigidly prevent lateral and longitudinal movement of the blade and cap with relation to the legs of the magnet, while the strength of the magnetic field is sufficient to hold the blades in operative position against the safety bar.

If the blade is to be removed, the ends of the cap are grasped between the thumb and first finger, and, against the magnetic attraction the cap may be removed, and then by a similar operation the blade may be disengaged from the guide and lock pins, and the safety bar. To removably secure the blade to the magnet a reversal of the steps would accomplish that end.

Desiring to protect my invention in the broadest manner legally possible, what I claim is:

1. In a device of the character described, the combination of a supporting member adapted to support a blade along one side thereof, and means including a magnet disposed on the side of the said member opposite to said side for directing magnetic flux through a blade on said side to hold the blade against the supporting member.

2. In a device of the character described, the combination of a guard member and a cap member adapted to hold a blade therebetween, the cap member being composed of magnetic material, and means including a magnet disposed on the side of the guard member opposite to the cap member for directing magnetic flux through the cap member to hold the cap upon the guard.

3. In a device of the character described, the combination of a base member, means for positioning a blade on the base member, and a magnet connecting with and extending from the base member, said magnet being arranged to draw the blade against the base member and also to serve as a handle.

4. In a device of the character described, the combination of a supporting member adapted to support a blade along one side thereof, and means disposed on the side of said member opposite to the blade for directing magnetic flux through the blade to hold it against the supporting member, the supporting member constituting a path of high reluctance so as not to shunt the magnetic flux from the blade.

5. In a device of the character described, the combination of a guard member and a cap member adapted to hold a blade therebetween, the cap member comprising a path of low reluctance and the guard member constituting a path of high reluctance, and means disposed on the side of the guard member opposite to the cap member for directing magnetic flux through the cap member to hold it upon the guard member.

6. In a device of the character described, the combination of a base member and a cap member adapted to hold a blade therebetween, the cap member constituting a path of low reluctance, and magnet means having poles of magnetic material extending into juxtaposition to the cap member at opposite sides of the cap member to direct flux through the cap member to hold it against the base member.

7. In a device of the character described, the combination of a base member and a cap member adapted to hold a blade therebetween, the cap member constituting a path of low reluctance, magnet means having spaced poles arranged to direct magnetic flux through the base member, blade and cap member, the base member constituting a path of high reluctance so as to reduce the amount of flux shunted from the blade and cap therethrough.

8. In a device of the character described, the combination of a non-magnetic base member and a magnetic cap member adapted to hold a blade therebetween, and magnet means having spaced poles of magnetic material extending through the base member into juxtaposition to the cap member.

9. A U-shaped magnet having two adjacent pole pieces; a metallic blade, a bar of non-magnetic material mounted upon the pole pieces of said magnet to serve as an abutting surface for said blade, a cap of magnetic material serving with the blade as an armature for the magnet, means to prevent the longitudinal and lateral movements of said blade and said cap in relation to said bar.

10. A magnet having two adjacent, separate, soft iron pole pieces, a bar of non-magnetic material extending across and being recessed to receive said pole pieces, a flat headed screw with spanner holes whereby each pole piece and each end portion of the bar may be secured to their respective leg of the magnet, a pin centrally mounted in the axis of each screw, a metallic blade with suitable holes for said pin to engage, and a cap of magnetic material also engaged by said pin, and serving as an armature for the magnetic circuit to confine the blade in abutment with the non-magnetic bar.

11. A safety razor comprising a guard adapted to support a blade along one side thereof, the guard having guard teeth along one edge, and magnetic means arranged to hold the blade on the guard for use in shaving, said means having a magnetic circuit which when broken permits the blade to be readily detached.

12. A safety razor comprising a guard having teeth along one edge, a cap disposed over the guard so as to position a blade between the cap and the guard with a cutting edge over the guard teeth, and magnetic means arranged to hold the cap and guard together for use in shaving, said means having a magnetic circuit which when broken permits the cap and guard to be readily separated.

13. A safety razor comprising a guard, a blade adapted to lie along the guard, and magnetic means for holding the blade on the guard, the magnetic means being so arranged that the blade is held on the guard for use in shaving solely by magnetism.

14. A safety razor comprising a guard, a blade adapted to lie along the guard, and magnetic means having members arranged on opposite sides of the blade and guard so as to hold the blade on the guard by the attraction between said members.

BUTLER AMES.